US008952279B2

(12) United States Patent
Yamanaka et al.

(10) Patent No.: US 8,952,279 B2
(45) Date of Patent: *Feb. 10, 2015

(54) SLIDE SWITCH (71) Applicant: Hosiden Corporation, Osaka (JP)

(72) Inventors: Satoshi Yamanaka, Osaka (JP); Kenjiro Desaki, Osaka (JP); Hirofumi Koizumi, Osaka (JP)

(73) Assignee: Hosiden Corporation, Osaka (JP)

(*) Notice: Subject to any disclaimer, the term of this patent is extended or adjusted under 35 U.S.C. 154(b) by 138 days.

This patent is subject to a terminal disclaimer.

(21) Appl. No.: 13/736,841

(22) Filed: Jan. 8, 2013

(65) Prior Publication Data

US 2013/0175145 A1 Jul. 11, 2013

(30) Foreign Application Priority Data

Jan. 11, 2012 (JP) ................................ 2012-002782

(51) Int. Cl.
| H01H 3/16 | (2006.01) |
| H01H 15/04 | (2006.01) |
| B60R 22/48 | (2006.01) |
| H01H 15/14 | (2006.01) |
| H01H 1/40 | (2006.01) |
| H01H 1/36 | (2006.01) |
| H01H 3/48 | (2006.01) |

(52) U.S. Cl.
CPC ............... *H01H 15/04* (2013.01); *B60R 22/48* (2013.01); *H01H 15/14* (2013.01); *H01H 1/40* (2013.01); *H01H 1/365* (2013.01); *H01H 3/48* (2013.01); *B60R 2022/4816* (2013.01)
USPC ........................................................ 200/61.59

(58) Field of Classification Search
USPC ....... 200/547, 61.58 B, 61.59, 537, 550, 549, 200/293–296, 303–307
See application file for complete search history.

(56) References Cited

U.S. PATENT DOCUMENTS

| 6,333,479 | B1 * | 12/2001 | Tai ................................ 200/550 |
| 6,483,063 | B2 * | 11/2002 | Chu .............................. 200/547 |
| 7,538,283 | B2 * | 5/2009 | Muromachi ........... 200/61.58 B |
| 2011/0067209 | A1 | 3/2011 | Yamanaka et al. |

FOREIGN PATENT DOCUMENTS

| EP | 2298611 | 3/2011 |
| JP | 2011-062423 | 3/2011 |

OTHER PUBLICATIONS

European Patent Office (EPO) Office action, mail date is Jul. 19, 2013.

\* cited by examiner

*Primary Examiner* — Edwin A. Leon
(74) *Attorney, Agent, or Firm* — Greenblum & Bernstein, P.L.C.

(57) ABSTRACT

A slide switch is provided that is more excellent in reliability than conventional techniques. A slide switch senses an extracted state and an inserted and engaged state of an object. The slide switch includes a body, a slider, a terminal, and an armature. The slider is slidably held in the body and is pushed by insertion of the object to slidingly move. The terminal is provided with a fixed contact point disposed on a surface, facing the slider, of the body along a sliding movement direction. The armature is attached to the slider and is provided with a moving contact point that slides on a fixed contact point disposition surface of the body in association with sliding movement of the slider. In the entire range of the sliding movement, the body and the slider cover all around the fixed contact point and the armature.

6 Claims, 12 Drawing Sheets

SLIDE SWITCH

TECHNICAL FIELD

The present invention relates to a slide switch that senses an extracted state and an inserted and engaged state of an object.

BACKGROUND ART

Figure 15:
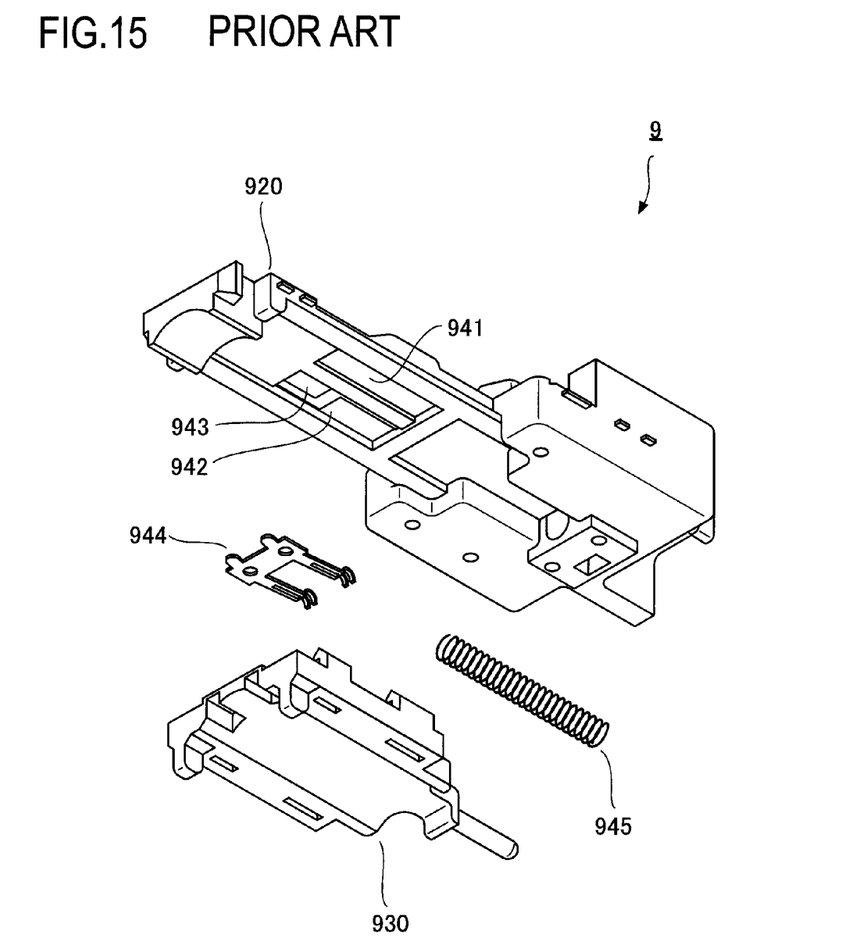
FIG. 15 is an exploded perspective view illustrating a configuration of a conventional slide switch.

Japanese Patent Application Laid Open No. 2011-62423 (hereinafter, referred to as Patent Literature 1) is understood as a conventional technique of a slide switch. FIG. 15 is an exploded perspective view illustrating a configuration of a slide switch 9 according to Patent Literature 1. The slide switch 9 is provided with a body 920, a slider 930 that is held slidingly movably in the body 920 and is pushed by a moving part on a buckle device side to slidingly move, fixed contact points 941 through 943 that are disposed on a surface, facing the slider 930, of the body 920 along a sliding movement direction, and a movable armature 944 that is attached to the slider 930 and slides on a fixed contact point disposition surface of the body 920 in association with sliding movement of the slider 930. The slider 930 is sized to cover up the fixed contact points 941 through 943 in the entire range of its sliding movement. A spring 945 biases the slider 930 in an extraction direction of a tongue.

With such a configuration, the fixed contact points are always covered up by the slider, so that they are not easily affected by a foreign substance and the like, and thus it is possible to prevent adhesion of a foreign substance, such as dust. Further, in a case of applying grease on the fixed contact points, it is possible to prevent adhesion of a foreign substance to the grease and transfer and adhesion of the grease to an unintended area or component.

SUMMARY OF THE INVENTION

Between the body 920 and the slider 930, a gap (clearance) is required to interpose the movable armature 944. Since the moving contact points are exposed from the gap, there is a possibility that a foreign substance enters from the gap before and upon incorporating the slide switch 9 into the buckle device and further during the use of the buckle device, and any or both of the fixed contact points and the moving contact points are contaminated and affected by the foreign substance.

It is an object of the present invention to provide a slide switch that is more excellent in reliability than conventional techniques.

In order to solve the problems, according to a first aspect of the present invention, a slide switch senses an extracted state and an inserted and engaged state of an object. The slide switch includes a body, a slider, a terminal, and an armature. The slider is slidably held in the body and is pushed by insertion of the object to slidingly move. The terminal is provided with a fixed contact point disposed on a surface, facing the slider, of the body along a sliding movement direction. The armature is attached to the slider and is provided with a moving contact point that slides on a fixed contact point disposition surface of the body in association with sliding movement of the slider. In the entire range of the sliding movement, the body and the slider cover all around the fixed contact point and the armature.

In order to solve the problems, according to a second aspect of the present invention, a slide switch senses an extracted state and an inserted and engaged state of an object. The slide switch includes a body, a slider, a terminal, and an armature. The slider is slidably held in the body and is pushed by insertion of the object to slidingly move. The terminal is provided with a fixed contact point disposed on a surface, facing the slider, of the body along a sliding movement direction. The armature is attached to the slider and is provided with a moving contact point that slides on a fixed contact point disposition surface of the body in association with sliding movement of the slider. The fixed contact point disposition surface of the body has a first tubular frame standing vertically to the fixed contact point disposition surface and laid out with the fixed contact point inside formed thereon. An armature mounting surface of the slider has a second tubular frame standing vertically to the armature mounting surface and storing the armature and the first tubular frame inside formed thereon.

According to the present invention, the body and the slider cover all around the fixed contact points and the armature in the entire range of sliding movement, so that the slide switch is less easily affected by a foreign substance and the like than conventional techniques and thus it is possible to prevent adhesion of a foreign substance, such as dust. Further, in a case of applying grease on the fixed contact points, it is possible to prevent adhesion of a foreign substance to the grease and transfer and adhesion of the grease to an unintended area or component more than conventional techniques. Accordingly, the slide switch according to the present invention exhibits effects of not impairing its performance by adhesion of a foreign substance and the like, being more excellent in reliability, and also being easily handled.

DETAILED DESCRIPTION OF THE EMBODIMENTS

Descriptions are given below to embodiments of the present invention. In the drawings used for the descriptions

First Embodiment

Figure 1:
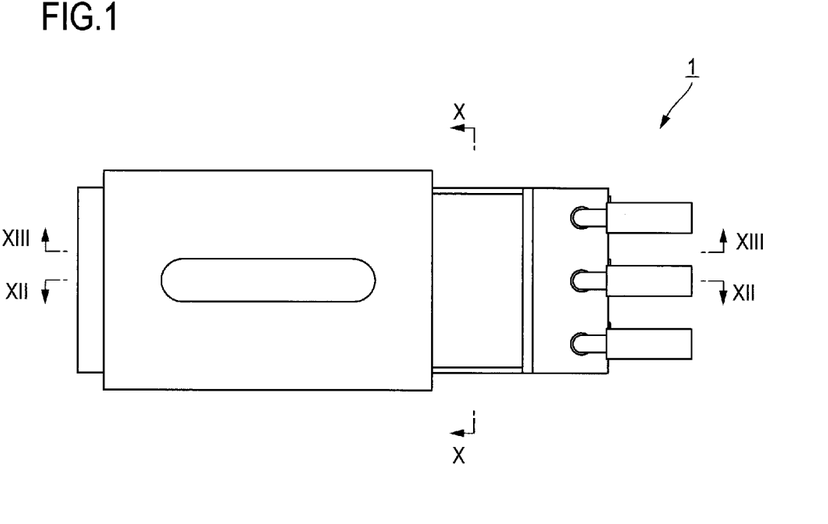
FIG. 1 is a front view of a slide switch according to a first embodiment.
Figure 2:
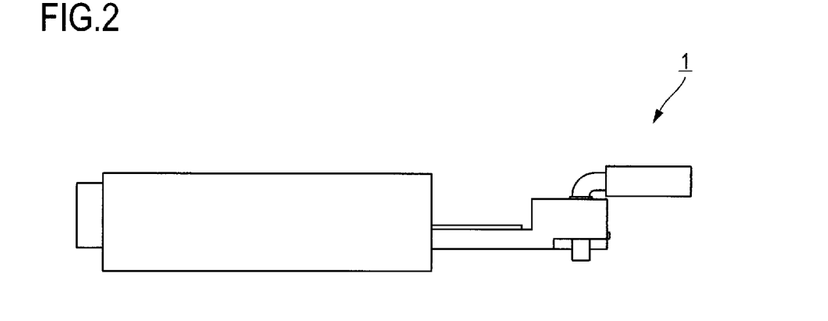
FIG. 2 is a bottom view of the slide switch according to the first embodiment.
Figure 3:
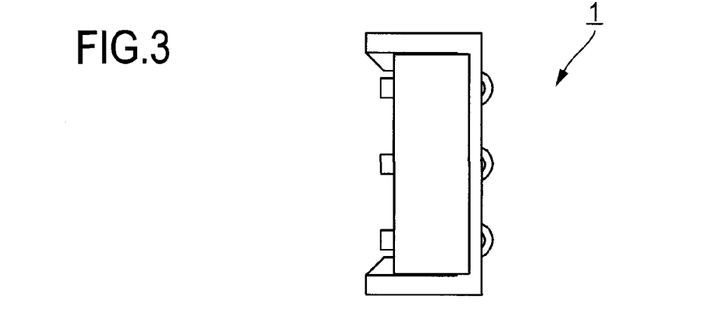
FIG. 3 is a left side view of the slide switch according to the first embodiment.
Figure 4:
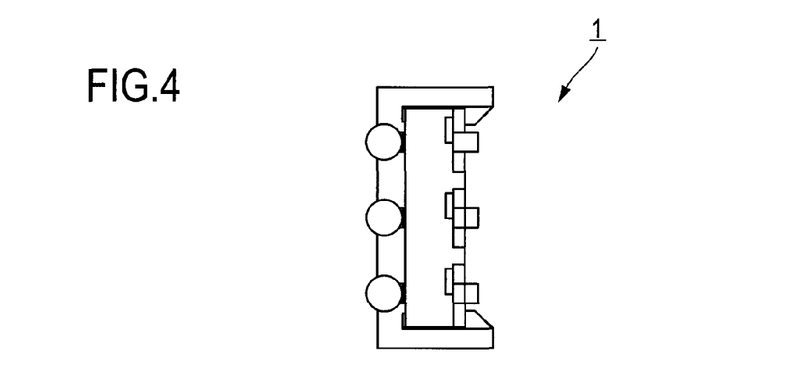
FIG. 4 is a right side view of the slide switch according to the first embodiment.
Figure 5:
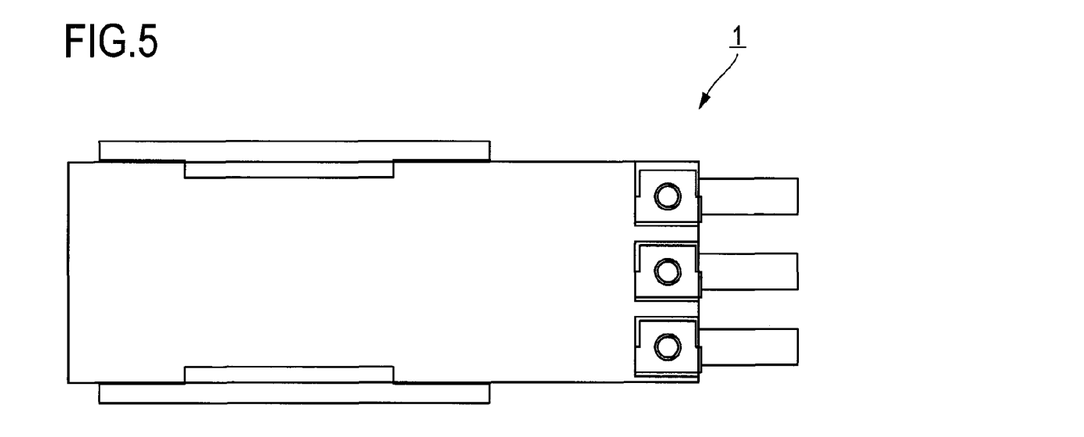
FIG. 5 is a back view of the slide switch according to the first embodiment.
Figure 6:
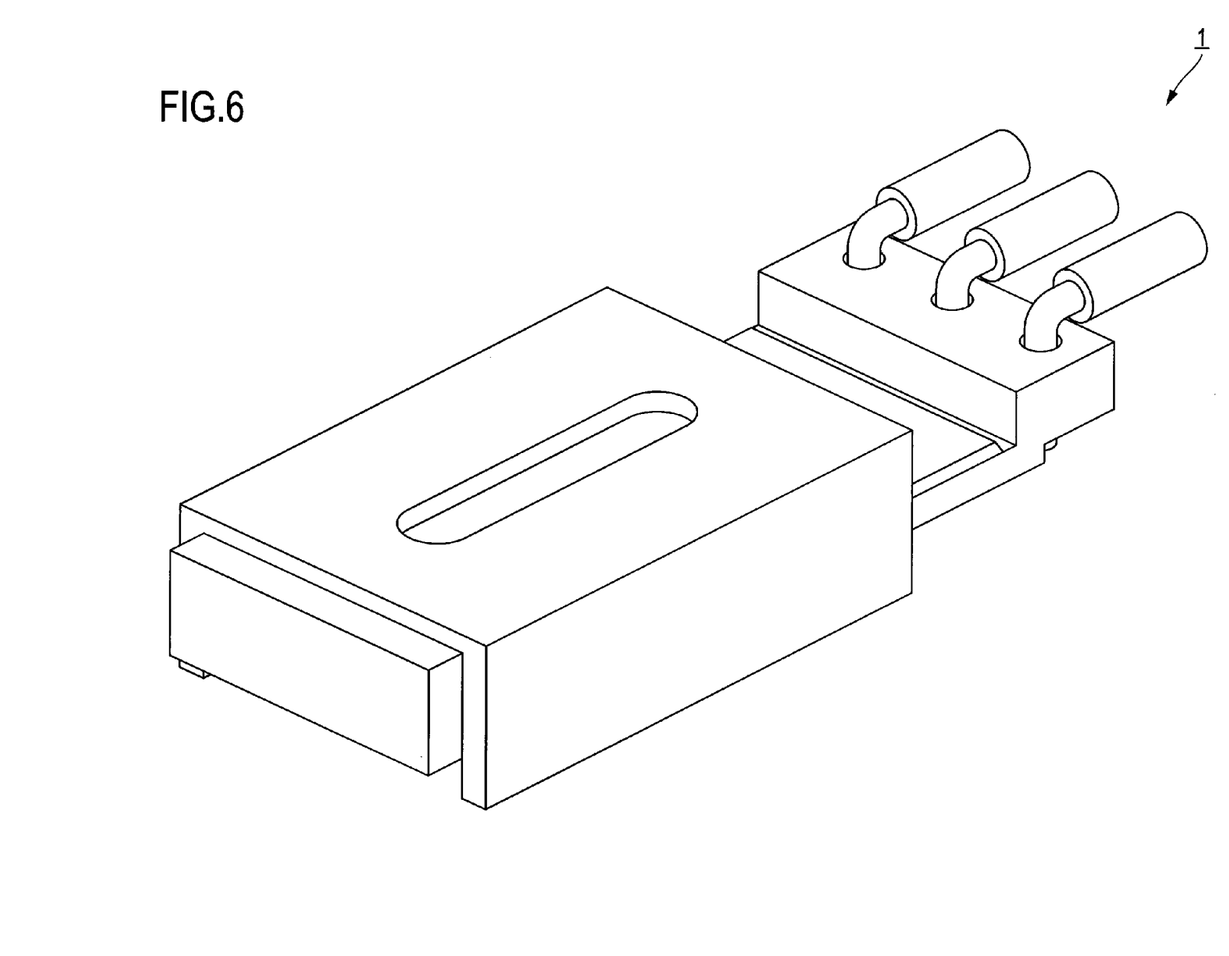
FIG. 6 is a perspective view of the slide switch according to the first embodiment viewed from the front.
Figure 7:
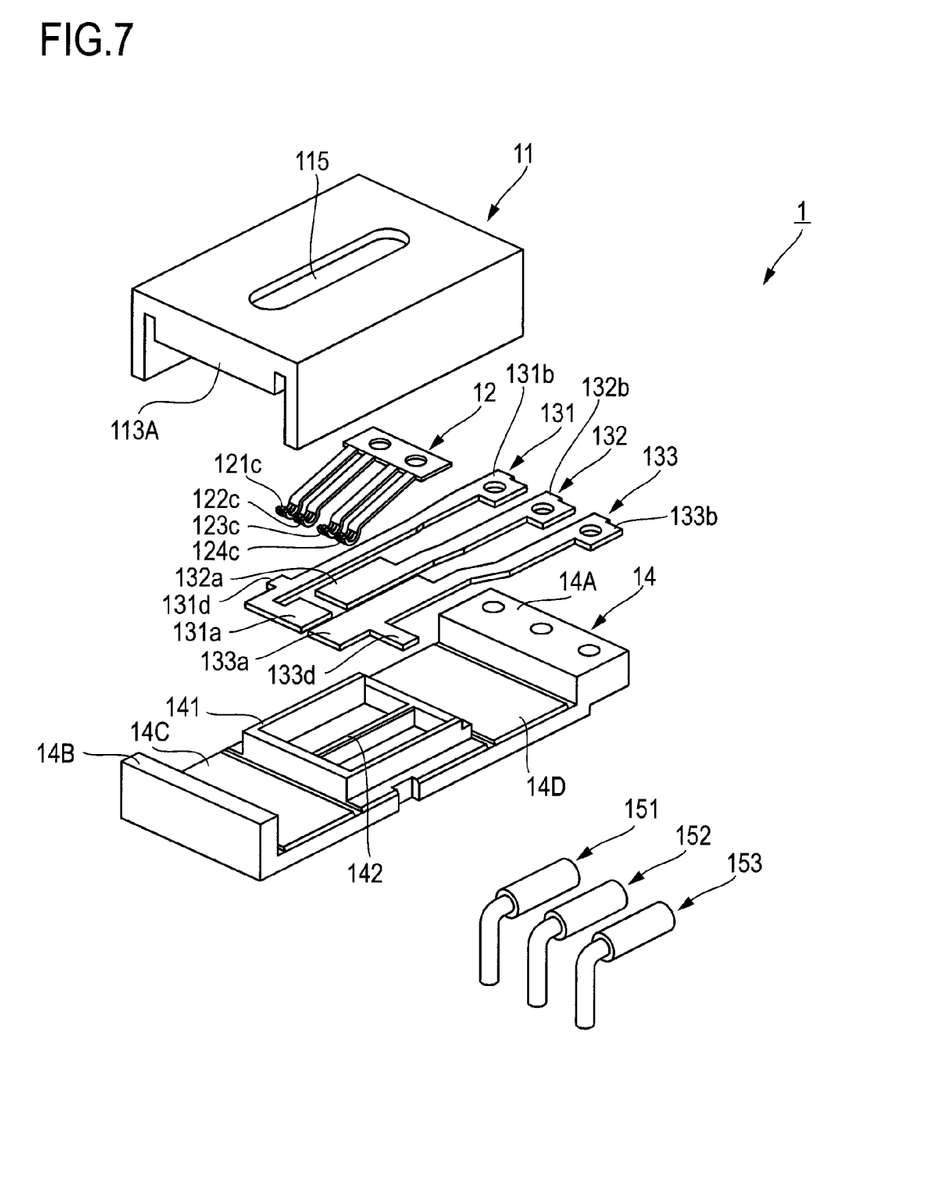
FIG. 7 is an exploded perspective view of the slide switch according to the first embodiment viewed from the front.
Figure 8:
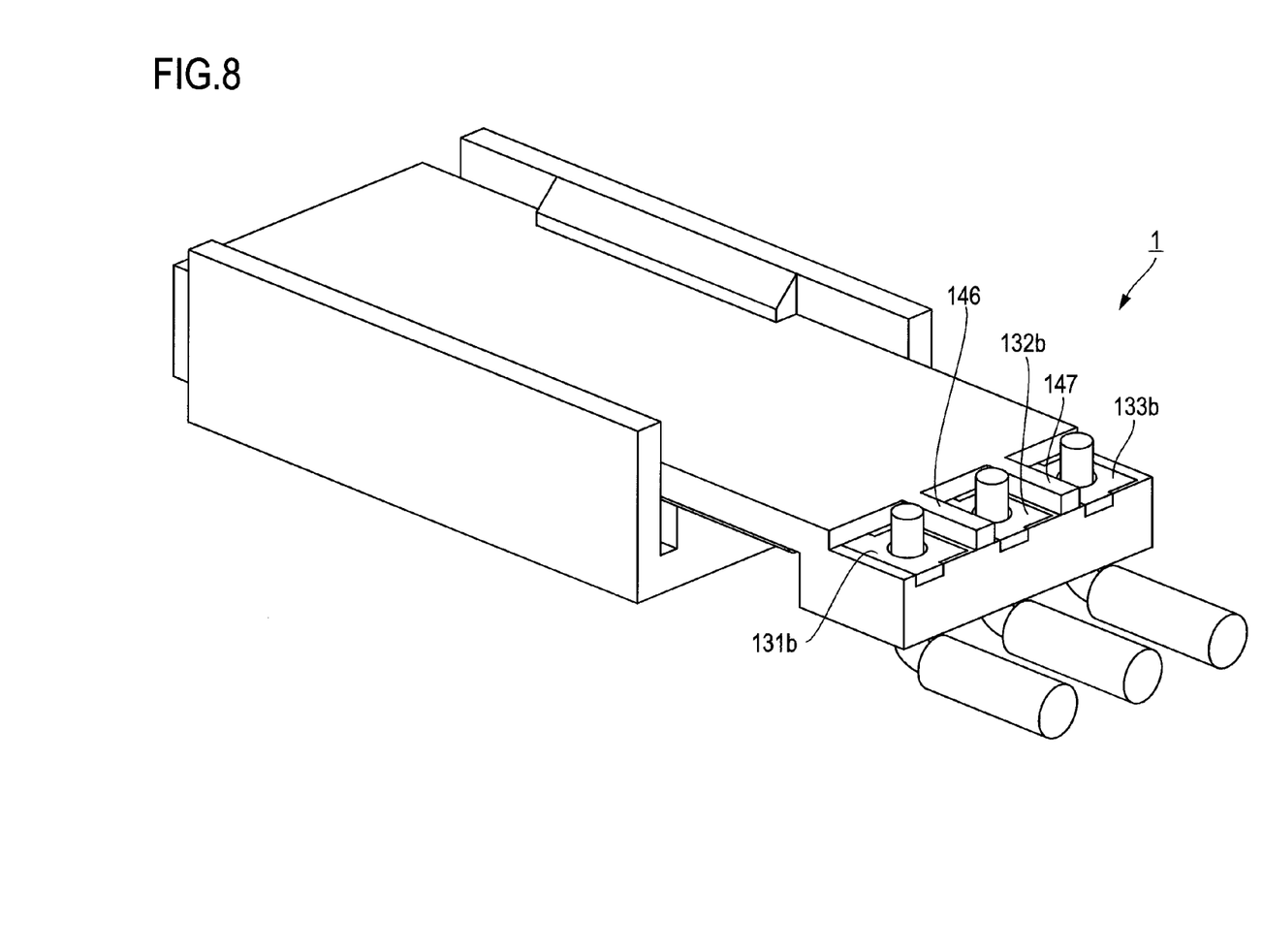
FIG. 8 is a perspective view of the slide switch according to the first embodiment viewed from the back.
Figure 9:
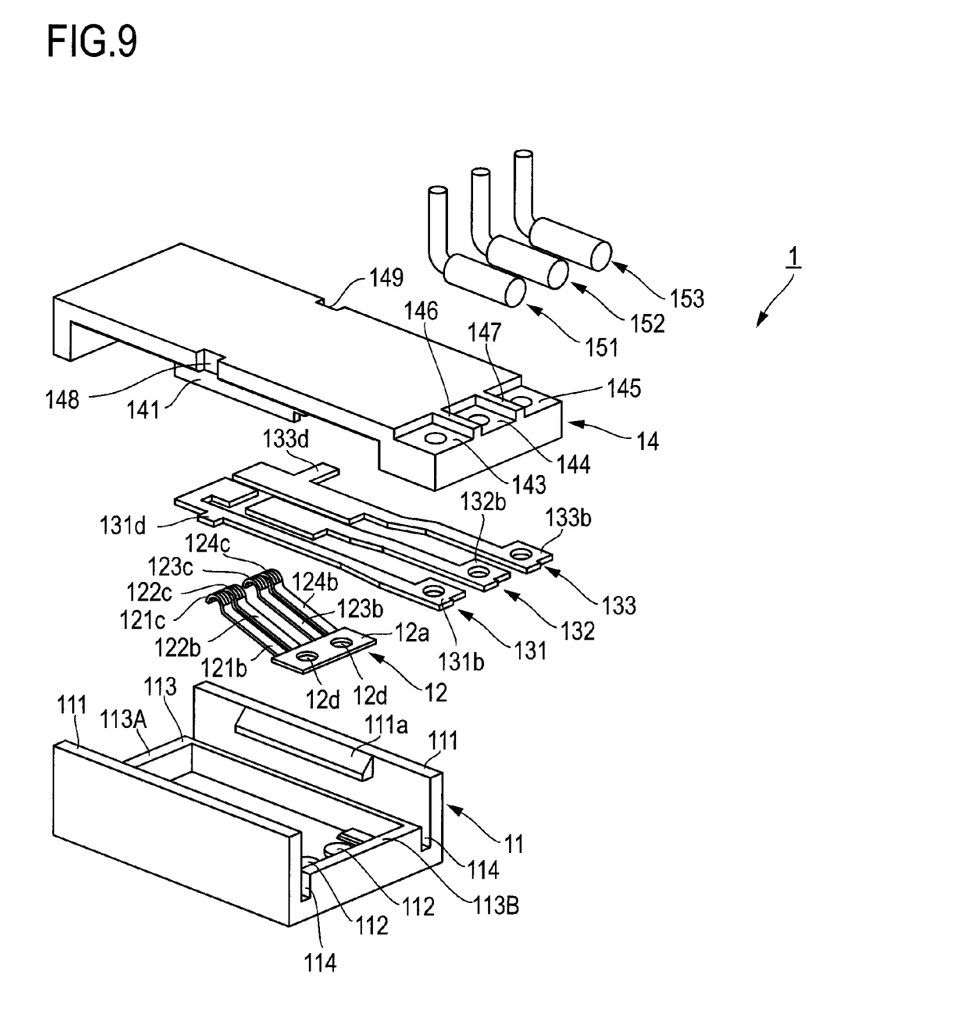
FIG. 9 is an exploded perspective view of the slide switch according to the first embodiment viewed from the back.

FIG. 1 illustrates a front view of a slide switch 1 according to a first embodiment, FIG. 2 illustrates a bottom view thereof, FIG. 3 illustrates a left side view thereof, FIG. 4 illustrates a right side view thereof, and FIG. 5 illustrates a back view thereof. FIG. 6 illustrates a perspective view of the slide switch 1 viewed from the front, FIG. 7 illustrates an exploded perspective view thereof, FIG. 8 illustrates a perspective view of the slide switch 1 viewed from the back, and FIG. 9 illustrates an exploded perspective view thereof. In some of the drawings, three harnesses 151 through 153 are shown collectively.

The slide switch 1 includes a slider 11, an armature 12, three terminals 131 through 133, and a body 14 (refer to FIGS. 7 and 9), and senses an extracted state and an inserted and engaged state of an object. In the present embodiment, the slide switch 1 is assumed to be incorporated into a buckle device having a tongue (tongue plate), attached to a seat belt, inserted therein for engagement and senses whether or not a crew has mounted the seat belt using the slide switch 1. In a case that the tongue is removed from the buckle device, a mechanism that returns the slider 11 to an initial position (a position in an extracted state of the tongue) is assumed to exist on a buckle device side. Therefore, a moving part is pushed in a post-action position (a position of the tongue in an inserted and engaged state) direction by inserting the tongue, and is pushed in an initial position direction by removing the tongue.

<Body 14 and Terminals 131 through 133>

Figure 10:
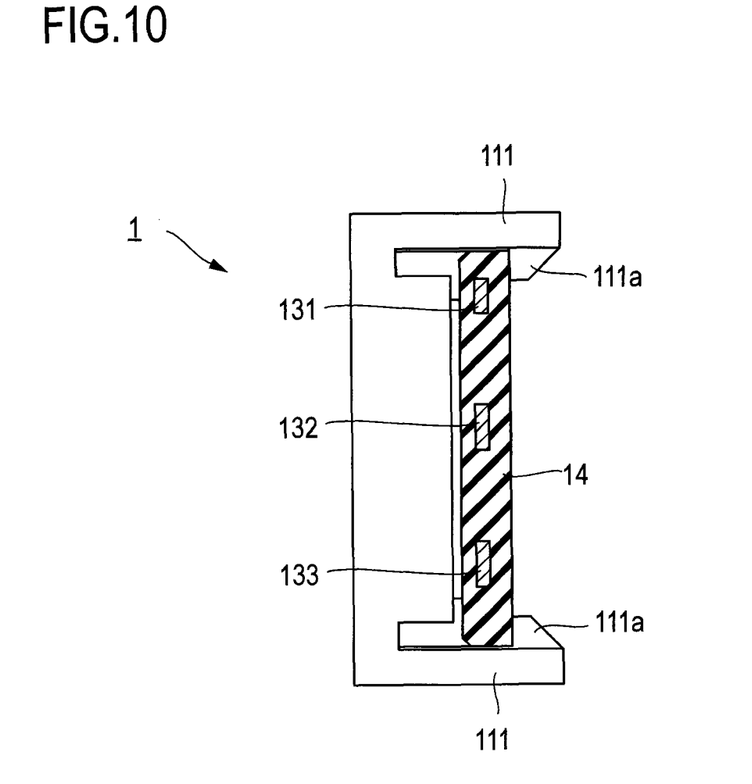
FIG. 10 is an X-X cross-sectional view of FIG. 1.

The body 14 is made of resin and is in an approximately rectangular plate shape. The body 14 is formed with the three terminals 131 through 133 by insert molding (refer to FIG. 10).

The terminals 131 through 133 are provided respectively with fixed contact points 131a through 133a on one end sides and with connections 131b through 133b on the other ends (refer to FIG. 7). Further, the terminals 131 and 133 are provided respectively with joints 131d and 133d extendingly formed in a width direction, orthogonal to a sliding movement direction, from the fixed contact points 131a and 133a. In a surface, facing the slider 11 described later, of the body 14, a slightly concave recess is formed along the sliding movement direction, and the fixed contact points 131a through 133a are disposed in this recess, respectively, and exposed above.

On the fixed contact point disposition surface of the body 14, a first tubular frame 141 is formed. The first tubular frame 141 is in a rectangular tube shape and stands vertically to the fixed contact point disposition surface. In other words, the first tubular frame 141 has one end laid out on the fixed contact point disposition surface and the other end opened. Inside the first tubular frame 141, the fixed contact points 131a through 133a are laid out (refer to FIG. 11).

Figure 11:
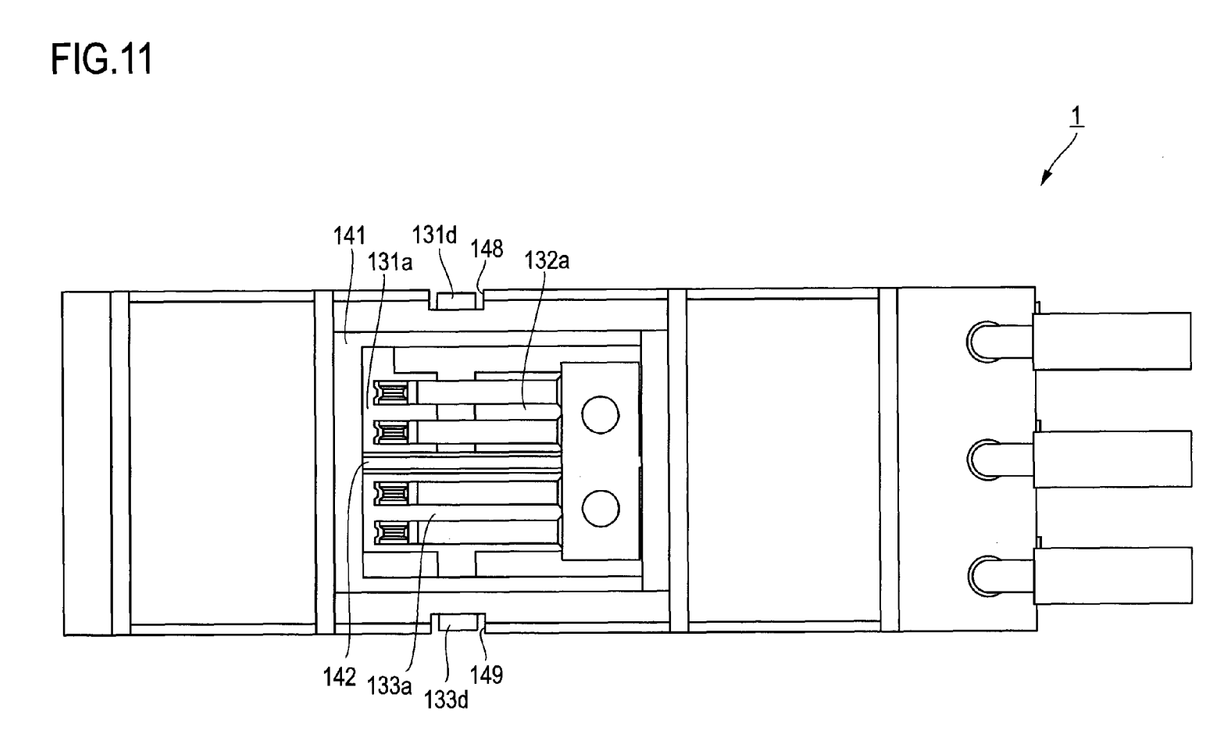
FIG. 11 is a front view of the slide switch according to the first embodiment looking through a slider.

The fixed contact points 131a and 132a are located on one half side of the width direction orthogonal to the sliding movement direction and are disposed by being sequentially arranged and also drawn in the sliding movement direction (refer to FIGS. 7 and 11). In other words, the fixed contact points 131a and 132a are disposed respectively in a portion of a slide position of moving contact points 121c and 122c of the armature 12 attached to the slider 11. The armature 12 is described later. The fixed contact point 133a is located on the other half side of the width direction orthogonal to the sliding movement direction and is disposed by being drawn in the sliding movement direction. In other words, the fixed contact point 133a is disposed in the entire range of a slide position of moving contact points 123c and 124c of the armature 12 attached to the slider 11. In the sliding movement direction, a tip end position of the fixed contact point 131a agrees with a tip end position of the fixed contact point 133a.

Between the fixed contact point 133a and the fixed contact points 131a and 132a, a standing wall 142 is formed (refer to FIGS. 7 and 11). Although there is a possibility of occurring defects, such as a short circuit due to a foreign substance or migration, between the terminal 133 of a grounding line and the terminals 131 and 132 of a power supply line, it is possible to inhibit such a short circuit by being equipped with the standing wall 142.

A front surface (the fixed contact point disposition surface) of the body 14 has one end portion (right end) in the sliding movement direction with an engagement wall 14A and has the other end portion (left end) with an engagement wall 14B, protrudingly formed therein respectively. The engagement walls 14A and 14B abut respectively on one end surface and the other end surface of the slider 11 to restrict the sliding movement. A back surface (the surface opposite to the fixed contact point disposition surface) of the body 14 has one end portion (right end) in the sliding movement direction with three recesses 143 through 145 formed therein (refer to FIG. 9), and the connections 131b through 133b are respectively located in these recesses 143 through 145 (refer to FIGS. 8 and 9). A standing wall 146 is formed between the recesses 143 and 144, and a standing wall 147 is formed between the recesses 144 and 145. Although there is a possibility of occurring defects, such as a short circuit due to a foreign substance or migration, between the terminals 131 and 132 of the power supply line or between the terminal 132 of the power supply line and the terminal 133 of the grounding line, it is possible to inhibit such a short circuit by being equipped with the standing walls 146 and 147.

Facing surfaces 14C and 14D are formed in the body 14. The facing surfaces 14C and 14D respectively face end surfaces of side walls 113A and 114B of the slider 11 in the entire range of the sliding movement of the slider 11 (refer to FIGS. 7, 13, and 14). The side walls 113A and 113B are described later. Foreign substance elimination grooves 14E and 14F are respectively formed at both end portions of the facing surface 14C in the sliding movement direction. Foreign substance elimination grooves 14G and 14H are respectively formed at both end portions of the facing surface 14D in the sliding movement direction. The foreign substance elimination grooves 14E and 14G respectively face the end surfaces of the side walls 113A and 113B in an initial position of the slider 11, and the foreign substance elimination grooves 14F and 14H respectively face the end surfaces of the side walls 113A and 113B in a post-action position of the slider 11.

The body 14 has top and bottom surfaces with grooves 148 and 149 respectively formed in positions corresponding to the joints 131d and 133d. When insert molding, the terminals 131 and 133 are fixed respectively in the joints 131d and 133d to form the grooves 148 and 149 so as to expose the joints 131d and 133d (refer to FIGS. 9 and 11).

<Slider 11 and Armature 12>

The slider 11 is made of resin and is in an approximately rectangular plate shape. The slider 11 has an armature mounting surface on both ends in the width direction orthogonal to the sliding movement direction with a pair of engagement pieces 111 formed protrudingly thereon. The engagement pieces 111 have tip ends (free ends) with engaging claws 111a formed inward to each other (refer to FIGS. 9 and 10).

The armature 12 is made with a flat spring material, and in the present embodiment, is made with a fixed portion 12a and four leg portions 121b through 124b supported by the fixed portion 12a (refer to FIG. 9). The four leg portions 121b through 124b bent backward from the fixed portion 12a have tip ends (free ends) respectively formed with the moving contact points 121c through 124c bent so as to be shaped in an arc.

The armature 12 is attached to a surface, facing the body 14, of the slider 11. The attachment is carried out by inserting a pair of dowels 112 formed on the surface, facing the body 14, of the slider 11 through a pair of holes 12d formed in the fixed portion 12a of the armature 12 to heat caulk the tip ends.

The armature mounting surface of the slider 11 has both end portions in the sliding movement direction respectively formed with the side walls 113A and 113B. On the armature mounting surface of the slider 11, a second tubular frame 113 is formed. The second tubular frame 113 is in a rectangular tube shape and stands vertically to the armature mounting surface. That is, the side walls 113A and 113B are formed as a portion of the second tubular frame 113. In other words, the second tubular frame 113 has one end laid out on the armature mounting surface and the other end opened. Inside the second tubular frame 113, the armature 12 and the first tubular frame 141 are stored.

Between walls making up the second tubular frame 113 formed along the sliding movement direction and the pair of engagement pieces 111, grooves 114 are formed, respectively. Upon attaching the slider 11 to the body 14, the front surface of the body 14 is engaged with the engaging claws 111a and the engagement pieces 111 are elastically deformed outwardly, and as the engaging claws 111a reach the back surface of the body 14 (in other words, the surface opposite to the surface facing the slider 11), the engagement pieces 111 are restored.

In the front surface of the slider 11, an elliptical engagement hole 115 is formed (refer to FIG. 7). The moving part equipped on the buckle device side is engaged with this engagement hole 115, thereby pushing the slider 11 in the sliding movement direction.

Figure 12:
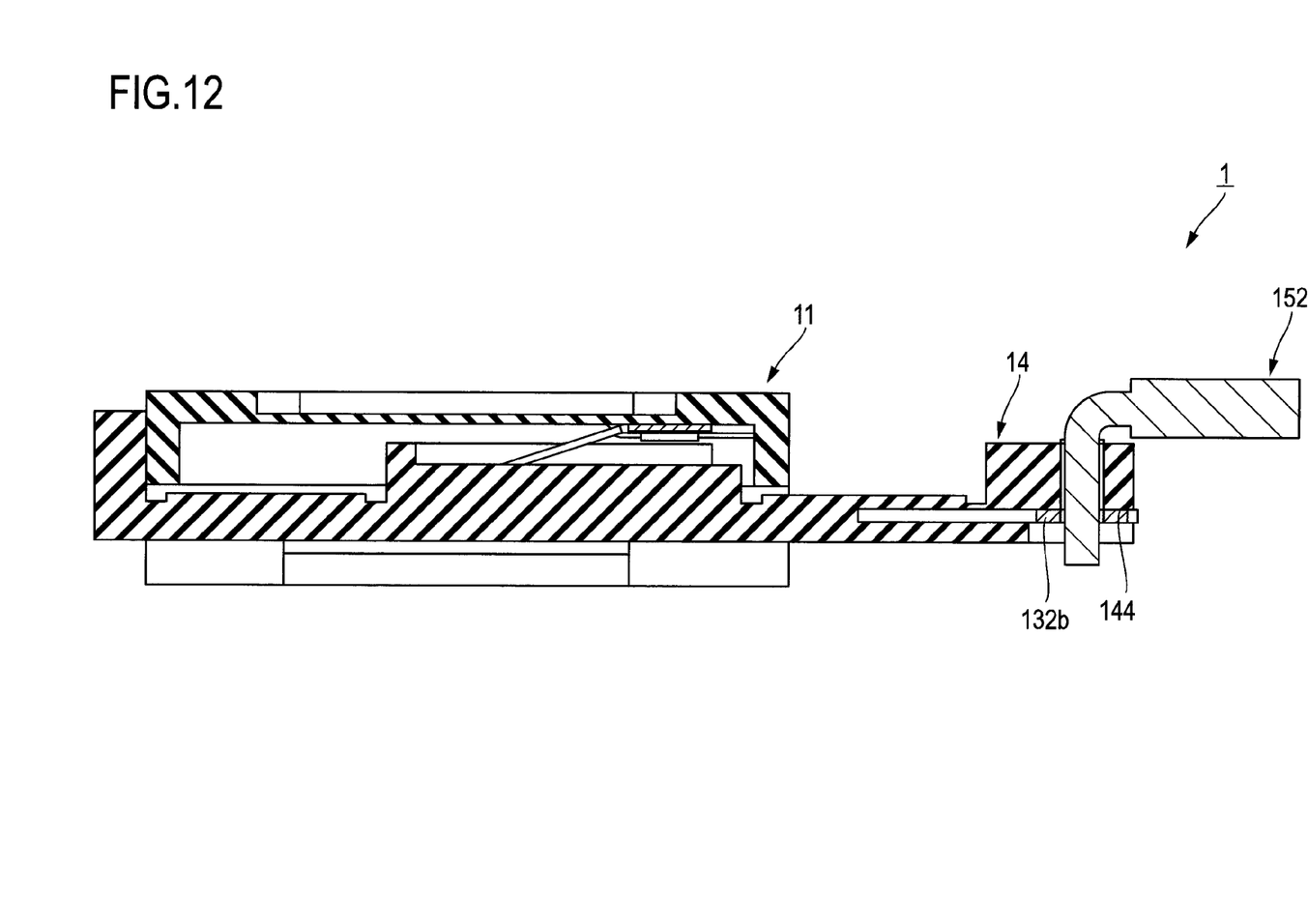
FIG. 12 is a XII-XII cross-sectional view of FIG. 1.

The connections 131b through 133b of the terminals 131 through 133 and the recesses 143 through 145 of the body 14 have holes formed respectively therein, and tip ends of the harnesses 151 through 153 are inserted into the holes and are solder fixed (refer to FIGS. 9 and 12).

With such a configuration, the slider 11 is slidably held in the body 14 and is pushed by inserting the tongue to slidingly move. Further, in the entire range of sliding movement, the body 14 and the slider 11 cover all around the fixed contact points 131a through 133a and the armature 12. In addition, in the entire range of sliding movement, the slider 11 covers all around the joints 131d and 133d and the grooves 148 and 149. With such a configuration, a foreign substance is prevented from entering into the grooves 148 and 149 located inside the engagement pieces 111 of the slider 11, and further, a foreign substance is prevented from entering inside the first tubular frame 141 and the second tubular frame 113 from the grooves 148 and 149. That is, it is possible to reduce routes of entry of a foreign substance.

<Action of Slide Switch 1>

As the tongue is inserted into the buckle device, the moving part equipped on the buckle device side is pushed, and the slider 11 is pushed by the moving part to slidingly move to the post-action position (the position of the tongue in the inserted and engaged state). As the tongue is removed from the buckle device, the moving part returns to the initial position in sliding movement by a mechanism on the buckle device side, and in association with that, the slider 11 is pushed by the moving part to return to the initial position in sliding movement. In association with the sliding movement of the slider 11, the moving contact points 121c and 122c slide on the fixed contact point 131a or 132a and the moving contact points 123c and 124c slide on the fixed contact point 133a. Descriptions are given in detail below.

The fixed contact points 131a through 133a are in a state of being disposed along the sliding movement direction of the slider 11 on a surface, near facing the slider 11, of the body 14, and the moving contact points 121c through 124c of the armature 12 slide on the fixed contact point disposition surface of this body 14 in association with the sliding movement of the slider 11. The fixed contact point 133a is located in the slide position of the moving contact points 123c and 124c over the entire length thereof. The fixed contact points 131a and 132a are located sequentially in the slide position of the moving contact points 121c and 122c.

In the initial position of the slider 11, the moving contact points 123c and 124c make contact with the fixed contact point 133a, and the moving contact points 121c and 122c make contact with the fixed contact point 131a (refer to FIG. 13) and the switch between the fixed contact points 131a and 133a is turned on (closed). In contrast, in the post-action position of the slider 11, the moving contact points 123c and 124c make contact with the fixed contact point 133a, and the moving contact points 121c and 122c make contact with the fixed contact point 132a (refer to FIG. 14) and the switch between the fixed contact points 132a and 133a is turned on (closed).

Figure 13:
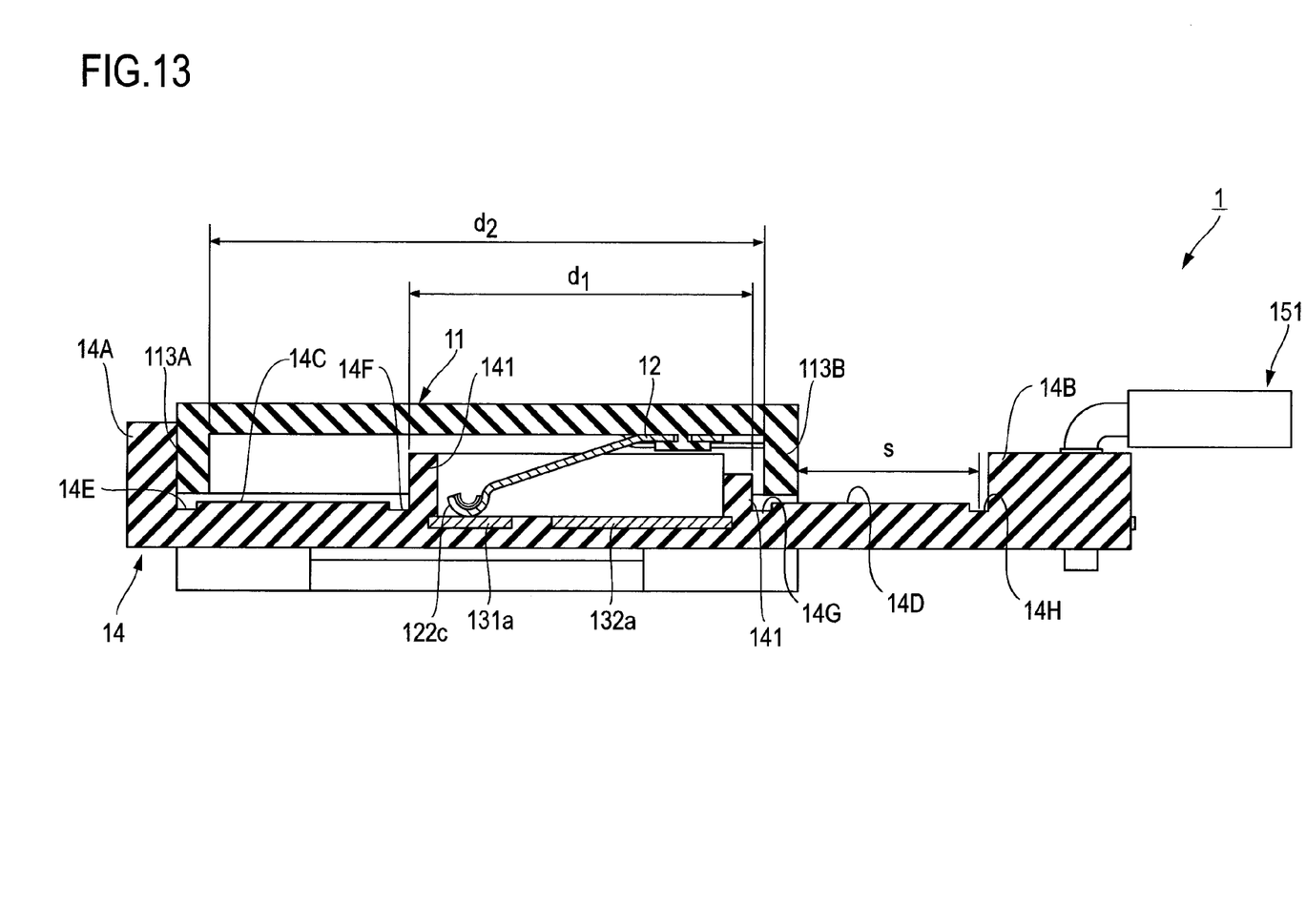
FIG. 13 is a XIII-XIII cross-sectional view of FIG. 1.
Figure 14:
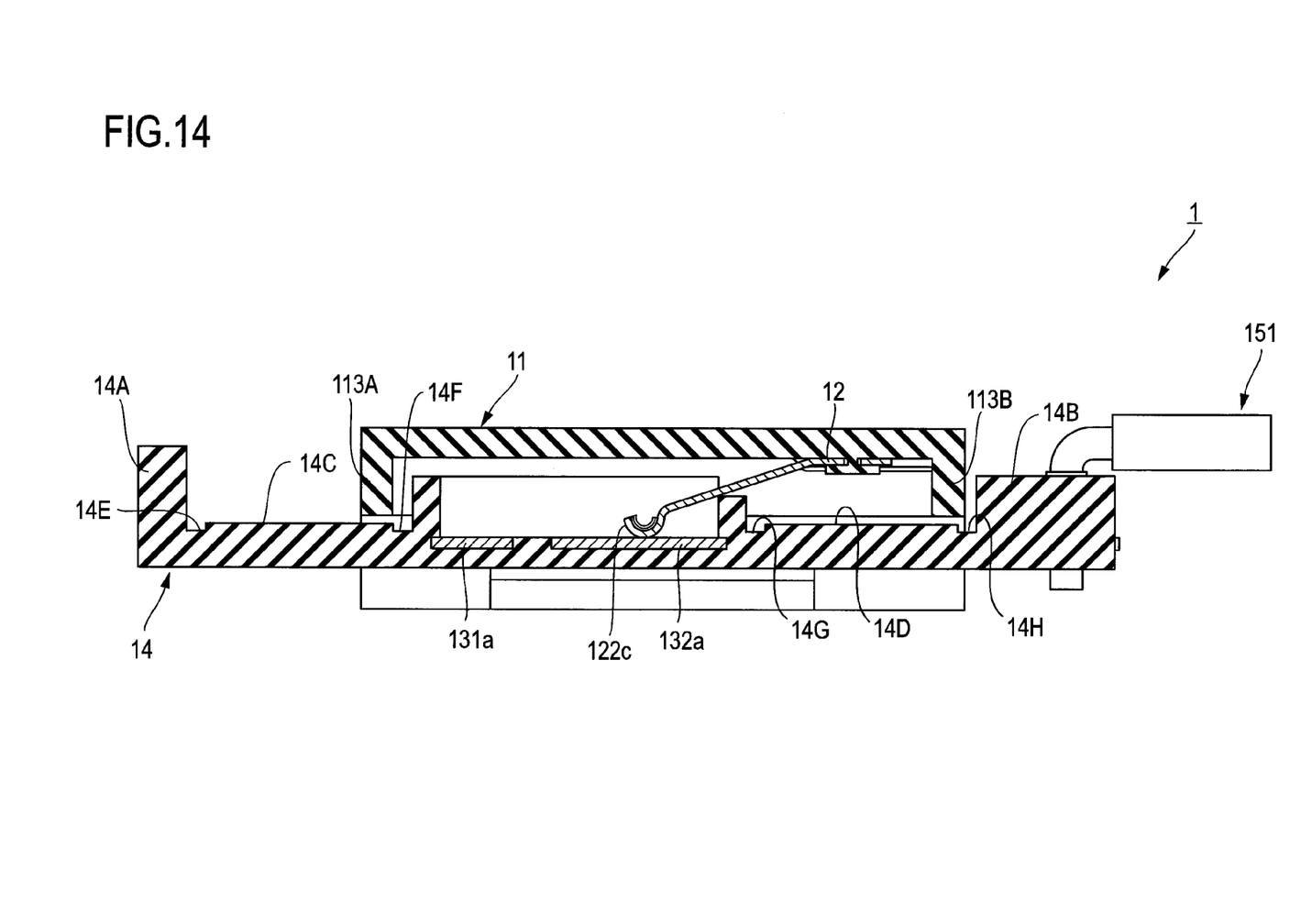
FIG. 14 is a diagram illustrating the slide switch with an object in an inserted and engaged state in FIG. 13.

The second tubular frame 113 is formed in such a manner that a distance $d_2$ of the inner periphery of the second tubular frame 113 in the sliding movement direction becomes not less than a sum of a distance $d_1$ of an outer periphery of the first tubular frame 141 in the sliding movement direction and an amount s of sliding movement (refer to FIG. 13).

In association with such movement of the slider 11, a contact state of the moving contact points is switched, and this enables to detect a latched state (the inserted and engaged state) and an unlatched state (the extracted state) of the tongue to the buckle device.

<Effects>

While, in Patent Literature 1, there is a gap between the body 920 and the slider 930 and the movable armature 944 is exposed from the gap, in the present embodiment, the first tubular frame 141 of the body 14 and the second tubular frame 113 of the slider 11 cover all around the fixed contact points 131a through 133a and the armature 12 in the entire range of sliding movement. That is, the fixed contact points 131a through 133a and the armature 12 are covered with the slider 11 and the body 14 so as not to be exposed outside directly for protection. Accordingly, compared with the conventional techniques, the armature 12 and the fixed contact points 131a through 133a are not easily affected by a foreign substance and the like and it is possible to prevent adhesion of a foreign substance, such as dust, and therefore, the performances are not impaired by adhesion of a foreign substance and the like, and thus it is possible to obtain a slide switch that is excellent in dust resistance and reliability.

In addition, while a foreign substance becomes even more easily adhered in a case of applying grease on the fixed contact points 131a through 133a in order to prevent corrosion of the fixed contact points 131a through 133a and also to improve slidability, such a problem is also solved by the present embodiment. Grease is not exposed similarly to the fixed contact points 131a through 133a, so that such problems do not occur that, for example, grease is transferred or adhered to an unintended area or component during a procedure, and therefore, it is possible to simplify the handling.

Further, while such measures are conventionally taken that, for example, quick drying grease is used in order to prevent adhesion of a foreign substance, such restrictions are eliminated in the present embodiment, so that there is also an advantage, such as enlarging a range of selecting grease.

Still in addition, the side walls 113A and 113B are formed so as to narrow the gap with the body 14, thereby enabling to reduce entrance of a foreign substance adhered to the facing surfaces 14C and 14D of the body 14. Further, the facing surfaces 14C and 14D are equipped with the foreign substance elimination grooves 14E through 14H, thereby enabling to reduce biting of a foreign substance adhered to the facing surfaces 14C and 14D. A foreign substance adhered to the facing surfaces 14C and 14D outside the second tubular frame 113 is swept into the foreign substance elimination grooves 14E and 14H by sliding movement of the side walls 113A and 113B. Although there is also a possibility that a foreign substance gets into the second tubular frame 113 of the slider 11, a foreign substance adhered to the facing surfaces 14C and 14D inside the second tubular frame 113 is swept into the foreign substance elimination grooves 14F and 14G by sliding movement of the side walls 113A and 113B. Therefore, such a configuration can reduce entrance and biting of a foreign substance and thus make the present embodiment excellent in reliability.

<Other Modifications>

The slide switch is not limited to those incorporated into a buckle device, but can also be utilized for overall slide switches that sense an extracted state and an inserted and engaged state of an object. In particular, a case of being applied to a slide switch having fixed contact points and moving contact points that are exposed is effective.

The moving part only needs to slidingly move in conjunction with sliding movement of an object. Therefore, the moving part may also be, not only those equipped on the side of a device having the slide switch incorporated thereto, those equipped on the side of an object and also be an object itself.

While the grooves 114 are formed respectively between the walls of the second tubular frame 113 formed along the sliding movement direction and the pair of engagement pieces 111 in the present embodiment, the pair of engagement pieces 111 may also be used as the walls of the second tubular frame 113 without being equipped with the grooves 114. In this case, while a length in the width direction orthogonal to the sliding movement direction can be shortened, a configuration as follows is required because the elastically deformed area in the engagement pieces 111 is shortened.

(1) In order to reduce the amount of elastic deformation of the engagement pieces 111, the size of the engaging claws 111a is made smaller. It should be noted that, in this case, there is a disadvantage of increasing the possibility that the engagement pieces 111 depart from the body 14 due to impact or the like.

(2) In order to be elastically deformed, the length of the engagement pieces 111 is required to be elongated. It should be noted that, in this case, there is a disadvantage of increasing the thickness of the slide switch 1.

(3) In the second tubular frame 113 of the slider 11, grooves are equipped. The grooves are formed between a wall equipped in an end in the sliding movement direction and a wall equipped in an end in the direction orthogonal to the sliding movement direction. While the first tubular frame 141 of the body 14 and the second tubular frame 113 of the slider 11 can cover all around the fixed contact points 131a through 133a and the armature 12 in the entire range of sliding movement even in this case, there is a disadvantage of increasing the possibility that a foreign substance enters from the grooves of the second tubular frame 113 of the slider 11.

(4) In order to facilitate elastic deformation of the engagement pieces 111, the thickness of the engagement pieces 111 is thinned. It should be noted that there is a disadvantage of not being able to obtain required strength when the engagement pieces 111 are thinned excessively.

While an electrical signal is taken out by soldering the three harnesses 151 through 153 to obtain an ON signal in the initial position and an ON signal in the post-action position, respectively, in the present embodiment, a detection method (usage) by soldering the two harnesses 152 and 153 to obtain an ON signal in the post-action position (a latched state of the tongue) may also be used. In this case, the terminal 131 may not be equipped.

While the present embodiment has a configuration that the mechanism to return the slider 11 in a case of removing the tongue from the buckle device exists on the buckle device side, it may also have a configuration that, for example, a spring, not shown, is interposed between the body 14 and the slider 11 to automatically return the slider 11 to the initial position by an elastic restoring force of the spring.

While the armature 12 is attached to the slider 11 by heat caulking in the present embodiment, those made with the armature 12 insert molded to the slider 11 may also be used. In addition, the armature 12 may also be fixed to the slider 11, not by heat caulking or insert molding, but by another method.

The present invention is not limited to the embodiments and modifications above but can be modified appropriately without departing from the spirit of the present invention.

What is claimed is:

1. A slide switch, sensing an extracted state and an inserted and engaged state of an object, comprising:
   a body;
   a slider slidably held in the body and pushed by insertion of the object to slidingly move;
   a terminal provided with a fixed contact point disposed on a surface, facing the slider, of the body along a sliding movement direction; and
   an armature attached to the slider and provided with a moving contact point sliding on a fixed contact point disposition surface of the body in association with sliding movement of the slider; wherein
   the body and the slider cover all around the fixed contact point and the armature in an entire range of the sliding movement.

2. A slide switch, sensing an extracted state and an inserted and engaged state of an object, comprising:
   a body;
   a slider slidably held in the body and pushed by insertion of the object to slidingly move;
   a terminal provided with a fixed contact point disposed on a surface, facing the slider, of the body along a sliding movement direction; and
   an armature attached to the slider and provided with a moving contact point sliding on a fixed contact point disposition surface of the body in association with sliding movement of the slider; wherein
   the fixed contact point disposition surface of the body has a first tubular frame standing vertically to the fixed contact point disposition surface and laid out with the fixed contact point inside formed thereon, and an armature mounting surface of the slider has a second tubular frame standing vertically to the armature mounting surface and storing the armature and the first tubular frame inside formed thereon.

3. The slide switch according to claim 2, wherein
the slider is in an approximately rectangular plate shape,
the slider has the armature mounting surface on both ends in a width direction orthogonal to the sliding movement direction formed with a pair of engagement pieces protrudingly thereon,
the engagement pieces have engaging claws formed inward to each other therein,
the second tubular frame of the slider is in a rectangular tube shape,
a groove is formed between a wall of the second tubular frame formed along the sliding movement direction and the engagement pieces, and,
upon attaching the slider to the body, the body is engaged with the engaging claws and the engagement pieces are elastically deformed outwardly, and as the engaging claws reach a surface opposite to a surface, facing the slider, of the body, the engagement pieces are restored.

4. The slide switch according to any one of claims 1 through 3, wherein
the moving contact point includes a first moving contact point and a second moving contact point,
the fixed contact point includes a first fixed contact point and a second fixed contact point, and,
in the body, the first fixed contact point is disposed in a portion of a slide position of the first moving contact point, the second fixed contact point is disposed in an entire range of a slide position of the second moving contact point, and a standing wall is formed between the first fixed contact point and the second fixed contact point.

5. The slide switch according to claim 3, wherein
a position of the slider in the extracted state of the object is an initial position, and a position of the slider in the inserted and engaged state of the object is a post-action position,
in both end portions of the armature mounting surface of the slider in the sliding movement direction, side walls are protrudingly formed respectively, and,
in the body, facing surfaces facing end surfaces of the side walls are formed in the entire range of the sliding movement, and foreign substance elimination grooves are formed in the facing surfaces facing the end surfaces of each of the side walls in the initial position and the post-action position.

6. The slide switch according to claim 4, wherein
a position of the slider in the extracted state of the object is an initial position, and a position of the slider in the inserted and engaged state of the object is a post-action position,
in both end portions of the armature mounting surface of the slider in the sliding movement direction, side walls are protrudingly formed respectively, and,
in the body, facing surfaces facing end surfaces of the side walls are formed in the entire range of the sliding movement, and foreign substance elimination grooves are formed in the facing surfaces facing the end surfaces of each of the side walls in the initial position and the post-action position.

\* \* \* \* \*